United States Patent
Mullens et al.

(10) Patent No.: US 6,914,906 B1
(45) Date of Patent: Jul. 5, 2005

(54) METHOD FOR RF NETWORK VIRTUAL END NODES

(75) Inventors: Lanny Joe Mullens, Scottsdale, AZ (US); David Wallis, Phoenix, AZ (US); Gail Miyamoto, Phoenix, AZ (US); Michael Kronick, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/108,463

(22) Filed: Jul. 1, 1998

(51) Int. Cl.$^7$ .............................................. H04L 12/56
(52) U.S. Cl. ...................................... 370/397; 370/401
(58) Field of Search ................................ 370/392, 397, 370/399, 401, 408, 470, 471, 475, 509, 512

(56) References Cited

U.S. PATENT DOCUMENTS

| | | | | |
|---|---|---|---|---|
| 4,894,822 A | * | 1/1990 | Buhrke et al. ................ 370/60 |
| 5,570,366 A | * | 10/1996 | Baker et al. ............. 370/85.13 |
| 5,787,253 A | * | 7/1998 | McCreery et al. ..... 395/200.61 |
| 5,930,259 A | * | 7/1999 | Katsube et al. | |
| 6,002,667 A | * | 12/1999 | Manning et al. ............ 370/232 |
| 6,041,358 A | * | 3/2000 | Huang et al. ............... 709/238 |
| 6,049,533 A | * | 4/2000 | Norman et al. ............. 370/328 |
| 6,061,349 A | * | 5/2000 | Coile et al. | |
| 6,205,147 B1 | * | 3/2001 | Mayo et al. ................ 370/397 |
| 6,324,177 B1 | * | 11/2001 | Howes et al. | |

* cited by examiner

*Primary Examiner*—Alpus H. Hsu
*Assistant Examiner*—Toan D. Nguyen
(74) *Attorney, Agent, or Firm*—Nicholas C. Oros; Frank J. Bogacz; Lawrence J. Chapa

(57) ABSTRACT

A method for virtual end nodes indicates in routing information (51) that the data packet is for a "special access" to an end node with a virtual address (60). An RF network device then inserts the identity of the physical end node (virtual address) into user information (62). If an access point (14) determines that the user information is for the virtual address (66), then all virtual end nodes 41–43 receive the data packet and analyze the virtual end node identity from the user information (68).

9 Claims, 2 Drawing Sheets

METHOD FOR RF NETWORK VIRTUAL END NODES

BACKGROUND OF THE INVENTION

The present invention pertains to RF (radio frequency) networks and more particularly to an arrangement for supporting virtual end nodes in an RF network.

In an RF network where end nodes communicate with access points via wireless communications, data packets are typically sent to the end node by means of a specific address associated with each end node. The access point is the network device which communicates directly with end nodes (users). A data packet typically includes, at the beginning, the routing information. The routing information includes the MAC address of the next hop on the network and the IP (internet protocol) address of the ultimate destination end node.

In such a system, the internet protocol addresses of the access point and end nodes must be registered in the routing tables in each of the RF repeaters and access points in order for messages to travel between end nodes. As a result, the number of end nodes users permitted to an access point was fixed depending on the size of the address fields within the normal internet protocol packet. Thus, if more end node users were to be added, more access points were required up to the limit of the fields in the internet protocol defining the addresses of the access points. Adding access points requires further processing by the RF network, takes up space for additional hardware and is costly.

Accordingly, it would be advantageous to provide an arrangement for extending the number of end node users connectable to an RF network while keeping the amount of added hardware and associated floor space required to a minimum. Further, such system should provide for a cost efficient way in which to add further end node users.

DESCRIPTION OF THE PREFERRED EMBODIMENT

Figure 1:
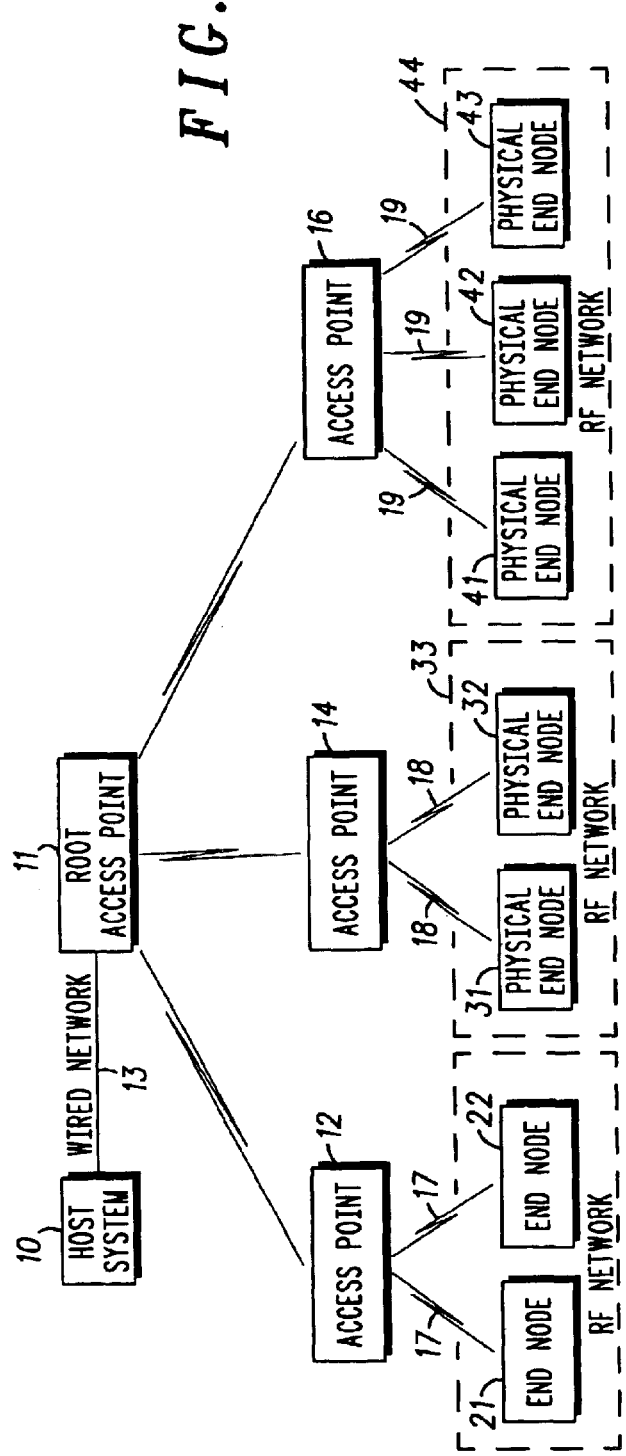
FIG. 1 is a block diagram of a virtual RF network for supporting extended end node users in accordance with the present invention.

FIG. 1 depicts a conventional RF internet system including standard end nodes and virtual end nodes. Host system 10 attempts to communicate with end node devices 21–43. End node devices 21 and 22 are standard RF end node devices. The RF internet is organized so that access points communicate via RF links to end nodes.

To communicate via the RF internet, host system 10, for example, transmits via a wired connection 13 to a root access point 11. The information transmitted by host system 10 may be buffered and is re-transmitted by root access point 11. Root access point 11 determines which lower level access point is to receive the message intended for an end node by looking at its routing tables. Root access point 11 tables the message through access points 12, 14 or 16, for example. Root access point 11 transmits via an RF link the message packet intended for a particular end node through access point 12, 14 or 16.

In the typical RF internet system, access point 12 then determines that the normal internet protocol (IP) routing information includes an address of either end node 21 or end node 22. As a result, access point 12 then via an RF link 17 transmits the data packet. All end nodes read the data packet and only the one addressed processes the user data and responds. The data portion of the normal internet protocol packet is then handled typically by the individual end node, 21 or 22 in this case.

The amount of data comprising the routing information is limited for this case of the normal internet protocol. As more and more end nodes are to be interconnected to the RF internet, the number that may be connected to a particular access point is limited by the size of the address fields in the normal internet protocol routing information. See FIG. 2. The result is that more access points must be added to add more end nodes. A method to add more end nodes for a given access point would greatly increase the system capacity and decrease the number of access points required for the system. In addition to being cost effective, having less access points in the system would take up less real estate and floor space in a distributed network approach. Both are highly desirable goals.

Figure 2:
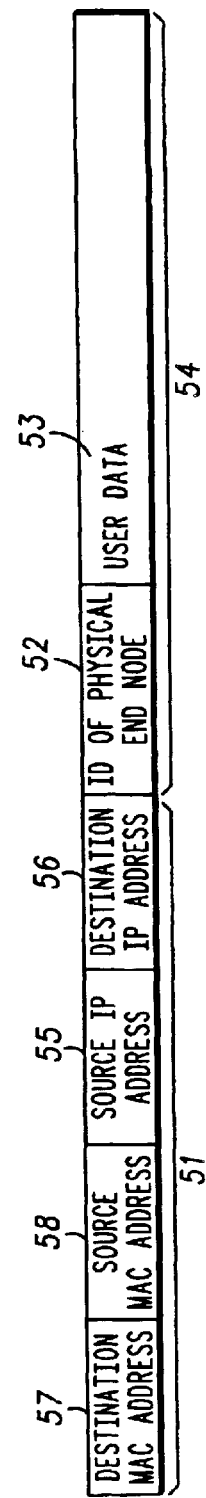
FIG. 2 is a layout of an internet protocol for routing of packets to virtual RF end node users in accordance with the present invention.

Referring to FIG. 2, an RF packet in the RF internet is shown with modifications in accordance with the present invention. The data packet 50 includes a normal internet protocol routing information 51 and user data 54. The normal or traditional internet protocol data packet includes the identity of the recipient 56 and the identity of the original source 55. The present invention, in part, places the identity of a physical end node into a field 52 and the remaining user data 53 in data packet 54.

Each access point in the RF system has an internet protocol address. This internet protocol address is included within the normal internet protocol routing information 51.

Referring again to FIG. 1, each access point 12, 14 and 16 and root access point 11 implements full internet protocol addressing. Although only one root access point 11 and three access points 12, 14 and 16 are shown, there may be many of these associated with the system and may be several levels of root access points. Also, within the normal IP routing information 51 is the identity of the intended end node included in field 56. In this way, the access points 12, 14 and 16 or host system 10 or root access point 11 may know the identity of the particular end node in its group to receive the message.

In the present invention, destination MAC address 52 and destination IP address 56 for the last hop from the access point are for the virtual node device. Since each access point 12, 14 and 16 has the routing information for its virtual end nodes, they can transmit to these devices. This routing information contains the MAC and IP addresses for the virtual end nodes. Each physical end node in the groups examines the extended identity field 52 to determine whether it is the data package target. The particular target physical end node 42, for example, will process the data and respond. Nodes 41 and 43 will not respond to the data packet because their identity does not match the address in field 52.

For example, should access point 14 receive a data packet indicating in the normal internet protocol routing information 51 that the recipient is a virtual end node device 33 which it has in its routing table, the access point 14 then transmits the data package to its physical end nodes 31 and 32. The physical end node identification 52 will be examined by all nodes 31 and 32 and the node addressed in field 52 will process the user data 53 and respond to the network.

Similarly, access point 16 may transmit data packets to virtual end 44 which has the effect of transmitting to physical end nodes 41, 42 or 43 via RF link 19. If the identity of physical end node 41 is indicated in field 52, node 41 will process the data, but all nodes 41–43 will read the data packet to determine whether the packet is for them.

As can be seen, the effect of adding field 52 adds the ability to address many physical end nodes using a single MAC an IP address pairs. Also, this scheme has the benefit that it does not disturb the field termed the normal internet protocol routing information 51. This is extremely important since this field has been standardized for use on the internet.

Figure 3:
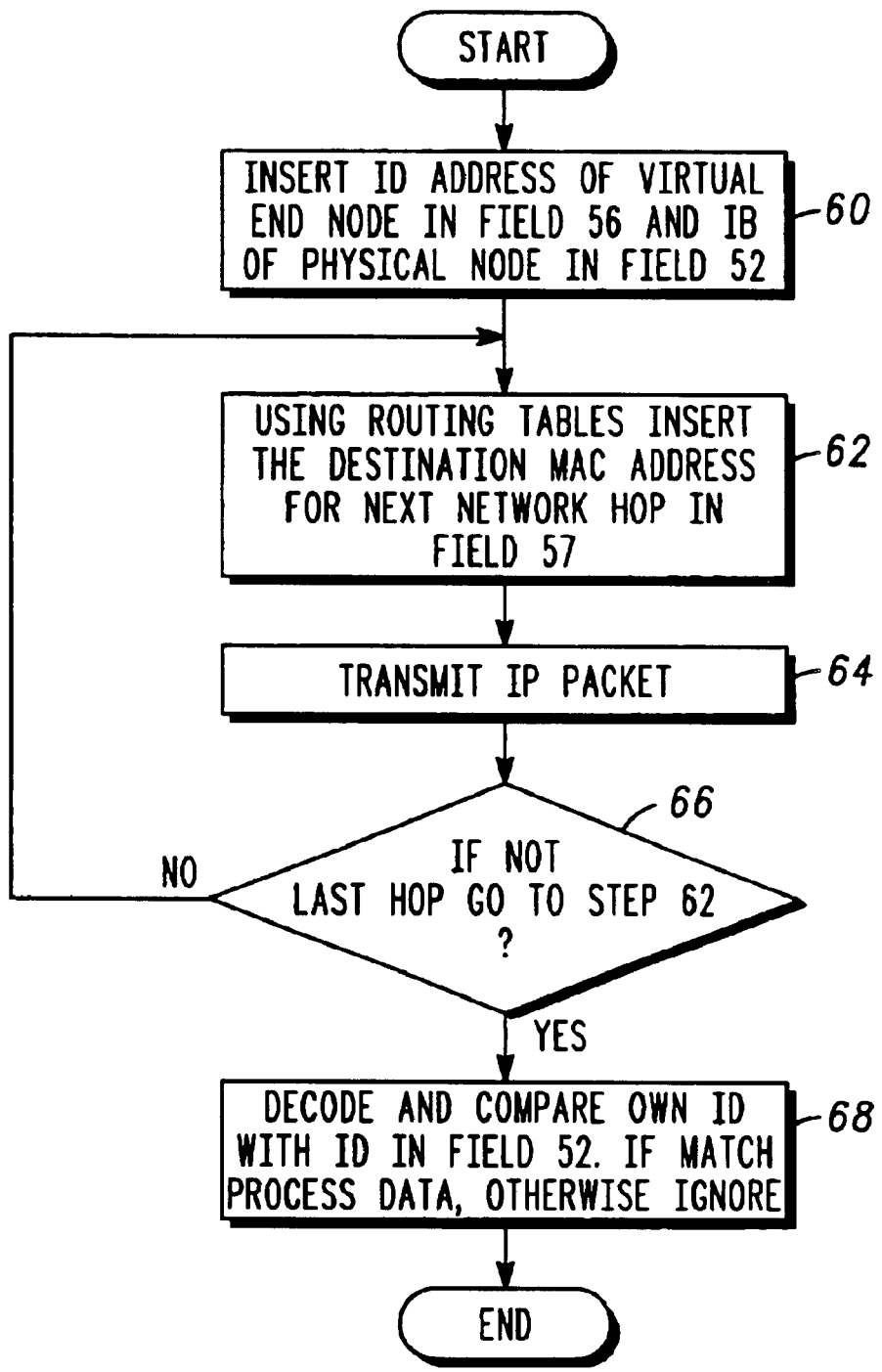
FIG. 3 is a flow chart of a method for virtual end nodes in accordance with the present invention.

Referring to FIG. 3, a flow chart of a method for virtual end nodes in an RF network is shown. The method is started and block 60 is entered. The IP address of the destination virtual end node is inserted in field 56 and the identification of the physical end node is inserted in 52.

Using the normal internet routing tables, the destination MAC address for the next hop is inserted into field 57. The packet is transmitted. The packet is then routed from hop to hop using normal internet routing protocol until it is transmitted for the last hop from the access point over the RF link.

At each hop along the way normal routing tables are used to determine the next hop. For the final hop from the access point to the virtual end node device, this is also true. The receiving physical end node devices receiving the RF packet decode the data field to find the destination ID in field 52. They compare this with their own ID. If there is a match, they accept the packet and process it, otherwise they ignore it.

As can be seen from the above explanation, a number of physical end nodes may be added to the capability of any access point in a network. The only limitation of this method is the number of bits that may be used within the user data to indicate the identity of various physical end nodes.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A method for sending an IP packet to a physical end node comprising the steps of:
    creating the IP packet comprising:
        a virtual internet protocol address corresponding to a plurality of physical end nodes served by a first access point; and
        a data field comprising:
            a destination identification corresponding to one of the physical end nodes of the plurality of physical end nodes, said one of the physical end nodes being a destination for the IP packet; and
            user data;
    communicating the IP packet to a first access point, serving a plurality of physical end nodes, over an RF network including one or more access points, communicatively coupled to one another, wherein at least some of the access points, each, serve one or more physical end nodes, via one or more wireless communication links, and one or more of the access points are connected to a wired network;
    transmitting, by the first access point, the IP packet;
    decoding, by the plurality of physical end nodes served by the first access point, the data field of the IP packet for determining the destination identification of the IP packet; and
    determining by each of the plurality of physical end nodes whether it is the destination for the IP packet.

2. The method of claim 1 wherein the step of determining is accomplished by each of the physical end nodes comparing their own identity with the destination identification in the user data of the IP packet.

3. The method of claim 1 further comprising the step of:
    processing the IP packet by the physical end node that is the destination for the IP packet.

4. The method of claim 1 further comprising:
    determining by the plurality of physical end nodes that are not the destination of the packet that the IP packet is not for them.

5. The method of claim 4 further comprising:
    ignoring the IP packet by the physical end nodes that are not the destination of the packet.

6. The method of claim 1 wherein the step of sending is accomplished by using internet protocol routing.

7. The method of claim 1 wherein the step of transmitting by the access point is transmitting by the access point via a wireless link.

8. A RF network comprising:
    a wired network;
    a first access point operable for communication via a first wireless link;
    a first plurality of physical end node communicating with the first access point via the first wireless link, sharing a first virtual internet protocol address and, each having a separate destination identification included within a data field of any IP packets intended for the corresponding physical end node; and
    a second access point connected to the wired network and to the first access point via a second wireless link.

9. The RF network of claim 8 further comprising:
    a second plurality of physical end nodes communicating with the second access point via the second wireless link, sharing a second virtual internet protocol address and having separate identifications.

* * * * *